United States Patent
Wang

(10) Patent No.: US 10,129,794 B2
(45) Date of Patent: Nov. 13, 2018

(54) RETURNING TO A FIRST NETWORK FROM A SECOND NETWORK AFTER PREMATURE TERMINATION OF A CIRCUIT SWITCHED FALLBACK VOICE CALL

(71) Applicant: Apple Inc., Cupertino, CA (US)

(72) Inventor: Zhiwei Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 15/118,455

(22) PCT Filed: Mar. 14, 2014

(86) PCT No.: PCT/CN2014/073435
§ 371 (c)(1),
(2) Date: Aug. 11, 2016

(87) PCT Pub. No.: WO2015/135198
PCT Pub. Date: Sep. 17, 2015

(65) Prior Publication Data
US 2017/0134993 A1    May 11, 2017

(51) Int. Cl.
*H04W 36/00* (2009.01)
*H04W 36/02* (2009.01)
*H04W 48/16* (2009.01)
*H04W 36/08* (2009.01)
*H04W 84/04* (2009.01)

(52) U.S. Cl.
CPC ....... *H04W 36/0022* (2013.01); *H04W 36/02* (2013.01); *H04W 36/08* (2013.01); *H04W 48/16* (2013.01); *H04W 84/042* (2013.01)

(58) Field of Classification Search
CPC ............. H04W 36/0022; H04W 36/02; H04W 36/08; H04W 48/16; H04W 84/042
See application file for complete search history.

(56) References Cited

U.S. PATENT DOCUMENTS

| 8,340,023 B2 | 12/2012 | Watfa et al. |
| 2011/0103277 A1 | 5/2011 | Waffa et al. |
| 2012/0157071 A1 | 6/2012 | Pudney et al. |

(Continued)

OTHER PUBLICATIONS

International Patent Application No. PCT/CN2014/073435—International Search Report and Written Opinion dated Dec. 12, 2014.

*Primary Examiner* — Jae Y Lee
(74) *Attorney, Agent, or Firm* — Dickinson Wright RLLP

(57) ABSTRACT

A method for returning to a first network from a second network after premature termination of a CSFB voice call is provided. The method can include a wireless communication device storing cell information for the first network while connected to the first network; participating in a CSFB procedure to transition to the second network in response to initiation of a voice call; and determining that the voice call has prematurely terminated. In response to premature termination of the voice call, the method can further include performing a scan for a first network cell based on stored cell information for up to a maximum scan time period; reselecting to a first network cell in an instance in which a first network cell is identified by the scan; and camping on the second network in an instance in which a first network cell is not identified by the scan.

20 Claims, 9 Drawing Sheets

(56) References Cited

U.S. PATENT DOCUMENTS

| | | |
|---|---|---|
| 2013/0034080 A1 | 2/2013 | Yang et al. |
| 2013/0053042 A1* | 2/2013 | Tanikawa .............. H04W 36/32 |
| | | 455/437 |
| 2013/0070728 A1 | 3/2013 | Umatt et al. |
| 2013/0183981 A1 | 7/2013 | Singh et al. |
| 2013/0223247 A1 | 8/2013 | Bae et al. |
| 2013/0258888 A1 | 10/2013 | Jeong et al. |
| 2013/0329567 A1* | 12/2013 | Mathias ................ H04W 36/30 |
| | | 370/242 |
| 2014/0066061 A1* | 3/2014 | Lou ....................... H04W 48/16 |
| | | 455/434 |

* cited by examiner

RETURNING TO A FIRST NETWORK FROM A SECOND NETWORK AFTER PREMATURE TERMINATION OF A CIRCUIT SWITCHED FALLBACK VOICE CALL

CROSS REFERENCE TO RELATED APPLICATIONS

This application is a national stage application under 35 U.S.C. § 371 claiming priority to PCT Application No. PCT/CN2014/073435, filed Mar. 14, 2014, which is incorporated by reference herein in its entirety for all purposes.

FIELD

The described embodiments relate generally to wireless communications technology. More particularly, the present embodiments relate to returning to a first network from a second network after premature termination of a circuit switched fallback (CSFB) voice call.

BACKGROUND

Cellular networks using newer radio access technology (RAT) systems, such as Long Term Evolution (LIE) systems, are being developed and deployed. Networks using these newer RATs often support faster data rates than networks utilizing legacy RATs, including various second generation (2G) and third generation (3G) RATs, such as Universal Mobile Telecommunications System (UMTS) networks and Global System for Mobile Communications (GSM) networks. However, in some deployments, LTE and other new RATs may not fully support some services that can be handled by legacy networks. Accordingly, LIE networks are often co-deployed in overlapping regions with legacy networks and wireless communication devices may transition between RATs as services or coverage may require. For example, in some deployments, LTE networks are not capable of supporting voice calls. Accordingly, when a wireless communication device receives or initiates a voice call while connected to a network that supports data sessions, but not voice calls, the wireless communication device can perform a circuit switched fallback (CSFB) procedure to transition to a legacy network that supports voice calls.

Due to the faster data rates offered by LTE networks, devices are redirected to an LTE network, if available, subsequent to a normal termination of a voice call for which a CSFB procedure has been successfully performed. However, in some instances, a CSFB voice call can prematurely terminate, such as due to a user aborting the voice call before the call is established pursuant to completion of the CSFB procedure, a failure of the CSFB procedure, or a radio link failure on the legacy network after completing the CSFB procedure to transition to the legacy network. In such instances, a wireless communication device can be without an active radio resource condition on either of the LTE network or the legacy network, and is not redirected back to the LTE network. Present wireless communication devices are generally configured in such instances to first connect to the legacy network and then perform a reselection procedure to transition to the LTE network from the legacy network, if the LTE network is found after camping on the legacy network. The extended duration spent camping on the legacy network before returning to the LTE network in the premature call termination scenario can negatively impact user experience due to the lower data rates provided by legacy networks. Further, the signaling required to establish a connection on the legacy network and to perform measurement and reselection to the LTE network can consume extra battery power and result in signaling overhead from the network perspective. Moreover, the device may not be pageable during the periods when establishing a connection on the legacy network and reselecting to the LTE network, and thus may miss a page for an incoming call. As such, camping first on the legacy network and then reselecting to the LTE network in a premature call termination scenario can result in an extended period of time in which the wireless communication device is not pageable, potentially leading to further call failures and missed calls.

SUMMARY

Some example embodiments facilitate a quicker return to a first network from a second network after premature termination of a CSFB voice call. More particularly, the wireless communication device of some example embodiments can be configured to store cell information for a first network. If there is a premature termination of a CSFB voice call, the wireless communication device of such example embodiments can use the stored cell information to scan for a first network cell before camping on the second network. If a first network cell is found, the wireless communication device can return directly to the first network without first camping on the second network, thus reducing battery consumption, signaling overhead, and the amount of time in which the device is not pageable, while also improving user experience by more quickly providing the faster data rates that may be offered by the first network. If, however, a first network cell is not found within a maximum scan time period following the premature call termination, the wireless communication device of some example embodiments may camp on the second network and reselect to the first network as conditions may permit.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
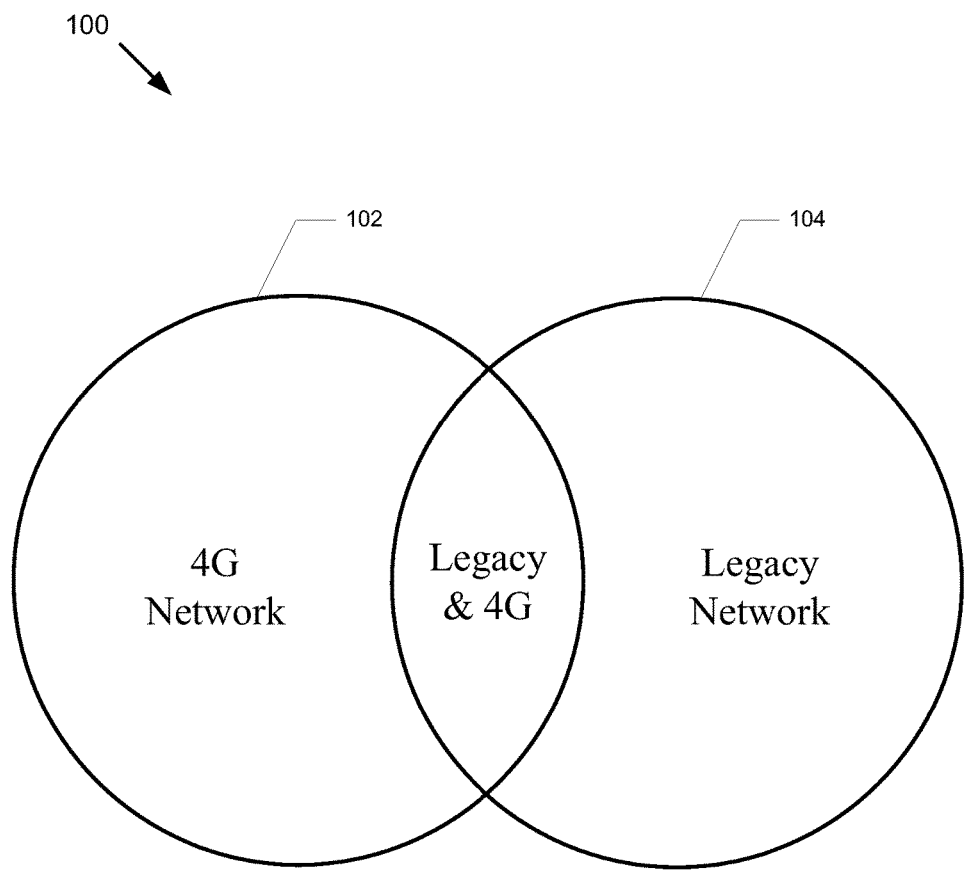
FIG. 1 illustrates overlapping coverage of a fourth generation network and a legacy network in accordance with some example embodiments.

FIG. 1 illustrates overlapping coverage of a fourth generation (4G) network 102 and a legacy network 104 in a communications system 400 in accordance with some example embodiments. The 4G network 102 can, for example, be a network using a 4G RAT, such as an LTE RAT (e.g., LTE, LTE-Advanced (LTE-A), and/or other present or future developed LTE RAT), which can offer faster data rates than legacy networks, such as 2G and 3G networks. However, the 4G network may not support voice calls. It will be appreciated that the 4G network is illustrated by way of example, and not by way of limitation. In this regard, other networks in existence now or that may be developed in the future that offer higher data rates but that do not support voice calls, such as various fifth generation (5G) networks now in development, can be substituted for the 4G network 102 within the scope of the disclosure. The legacy network 104 can be any legacy network having a circuit switched (CS) domain configured to support voice calls. By way of non-limiting example, the legacy network 104 can be a 3G network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy network 104 can be a CDMA2000 network, such as a 1×RTT network, or other network standardized by the Third Generation Partnership Project 2 (3GPP2) that includes a CS domain. As another example, the legacy network can be a 2G network such as a Global System for Mobile Communications (GSM) network.

The 4G network 102 and legacy network 104 can each have regions of coverage represented by the respective circles illustrated in FIG. 1. The regions of coverage can at least partially overlap, such as illustrated by the overlapping portions of the circles in FIG. 1. A wireless communication device in accordance with some example embodiments can operate on both the 4G network 102 and the legacy network 104. Thus, for example, when the wireless communication device is in a region of overlapping coverage, the wireless communication device can be connected to the 4G network and can perform a CSFB procedure to transition to the legacy network 104 in response to initiation of a voice call so that the voice call can be serviced on a CS domain of the legacy network 104.

Figure 2:
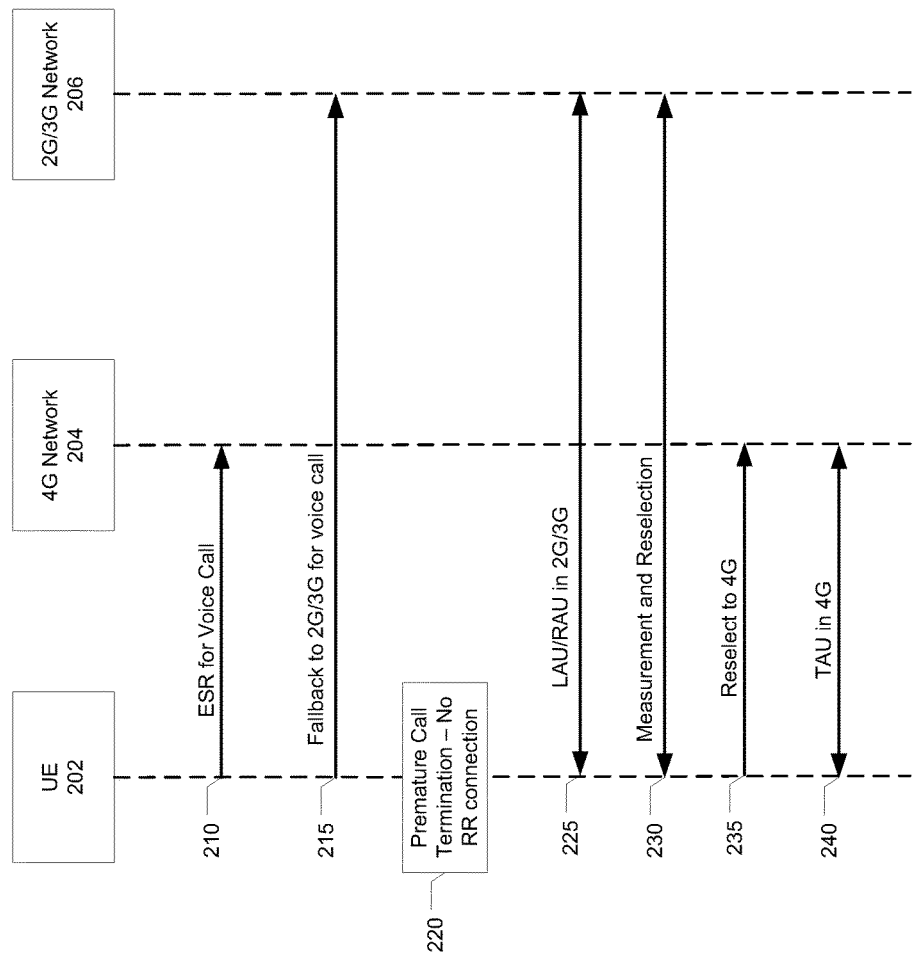
FIG. 2 illustrates a signaling diagram for an example scenario in which a prior art wireless communication device can remain on a legacy network for an extended duration after premature termination of a CSFB voice call.

FIG. 2 illustrates a signaling diagram for an example scenario in which a prior art wireless communication device can remain on a legacy network for an extended duration after premature termination of a CSFB voice call. In this regard, FIG. 2 illustrates signaling that can be exchanged between user equipment (UE) 202, a 4G network 204, and a 2G/3G network 206. The 4G network 204 can, for example, be an embodiment of 4G network 102. The 2G/3G network 206 can use any 2G and/or 3G RAT that includes a CS domain configured to support a voice call, and can, for example, be an embodiment of the legacy network 104. The UE 202 can be a wireless communication device capable of accessing both the 4G network 204 and the 2G/3G network 206.

The UE 202 may be connected to the 4G network 204, and may send an extended service request (ESR) message in response to initiation of a voice call, at operation 210. For example, if a user of the UE 202 initiates a voice call such that the voice call is a mobile originated (MO) voice call from the perspective of the UE 202, the UE 202 may send an ESR message to the 4G network 204. Alternatively, if a remote device initiates a voice call to the UE 202 such that the voice call a mobile terminated (MT) voice call from the perspective of the UE 202, the UE 202 may send an ESR message to the 4G network 204 indicating that MT CSFB is acceptable in response to signaling from the 4G network 204 notifying the UE 202 of the MT voice call. For example, if the UE 202 is in IDLE state on the 4G network 204, the 4G network 204 can page the UE 202 to notify the UE 202 of the MT voice call. As another example, if the UE 202 is in CONNECTED state on the 4G network 204, the 4G network 204 can send a CS service notification message to the UE 202 to notify the UE 202 of the MT voice call. Accordingly, for example, the UE 202 can send an ESR message to the 4G network 204 in response to a page or CS service notification message in the event of a MT voice call.

The ESR message may trigger initiation of a CSFB procedure such that the UE 202 can transition to the 2G/3G network 206 for servicing of the voice call. The UE 202 can, in turn, fallback to the 2G/3G network 206, at operation 215.

The voice call can prematurely terminate, as illustrated by operation 220. For example, premature termination can result from a user aborting the voice call (e.g., a user of the UE 202 or a user of the other device participating in the call) prior to completion of voice call establishment. As another example, premature termination can result from a failure of the CSFB procedure. As a further example, in some instances, the CSFB procedure and call establishment can be completed successfully, but a radio link failure can occur on the 2G/3G network 206. As a result of the premature call termination, the UE 202 may not have a radio resource (RR) connection on either of the 4G network 204 or the 2G/3G network 206, and thus does not receive a network redirection to the 4G network 204.

Prior art devices, such as the UE 202, can be configured to respond to the premature call termination by camping on the 2G/3G network 206 without first searching for the 4G network 204. As such, the UE 202 can perform a location area update (LAU) and/or routing area update (RAU) on the 2G/3G network 206, at operation 225. After camping on the 2G/3G network 206, the UE 202 can perform a measurement of the 4G network 204 and, provided any applicable reselection thresholds are met, can exchange appropriate reselection signaling with the 2G/3G network 206, as illustrated by operation 230.

Operation 235 can comprise the UE 202 reselecting to the 4G network 204. Attendant to reselection to the 4G network 204, the UE 202 can perform a tracking area update (TAU) in the 4G network 204, as illustrated by operation 240.

During the period including operations 225-230, the UE 202 can suffer from low throughput for any data communications due to the lower data rates offered by the 2G/3G network 206 compared to the 4G network 204. Further, the performance of LAU/RAU and measurement and reselection operations on the 2G/3G network 206 in addition to TAU on the 4G network 204 can increase battery consumption and network signaling overhead.

Figure 3:
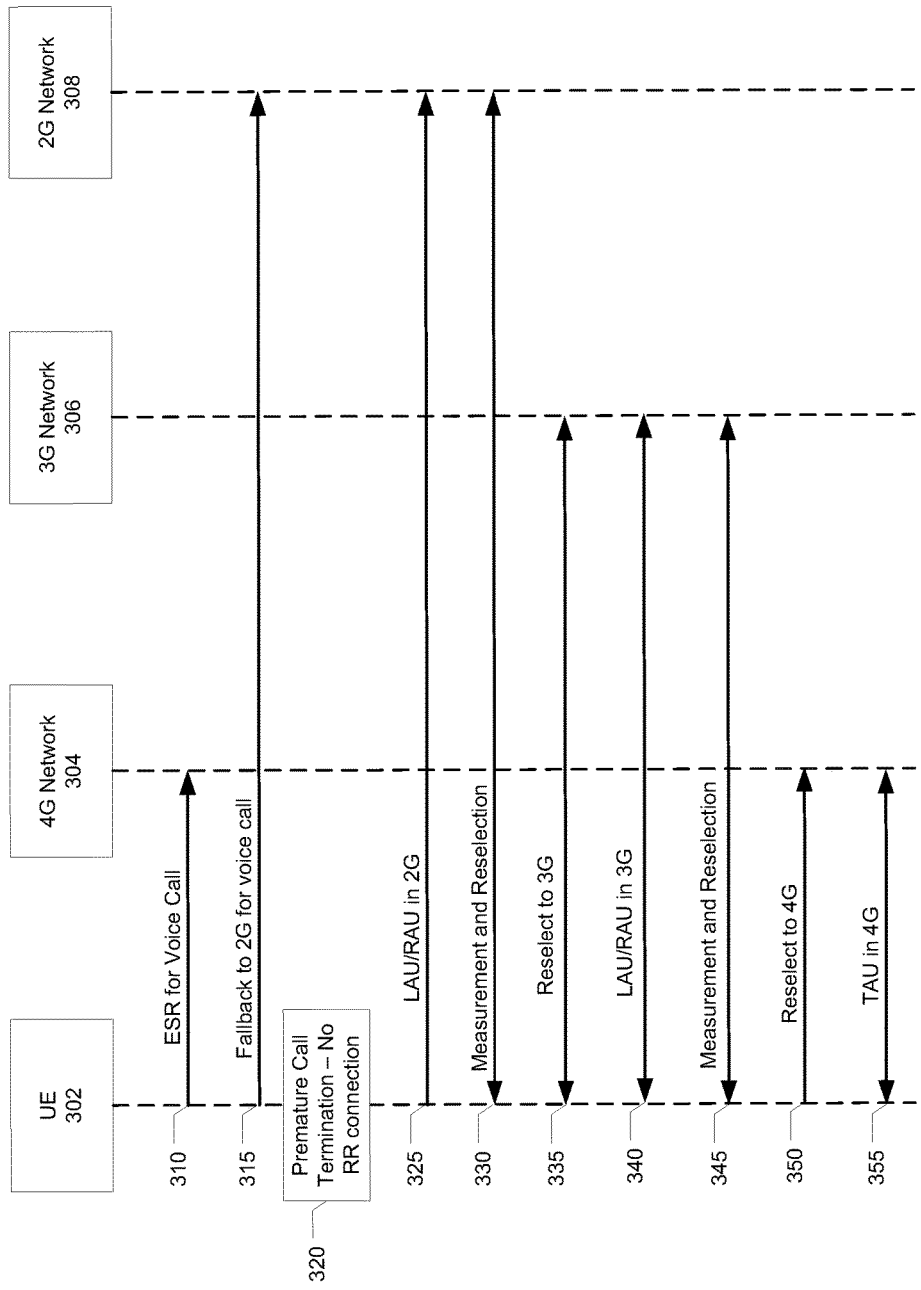
FIG. 3 illustrates a signaling diagram for another example scenario in which a prior art wireless communication device can remain on a legacy network for an extended duration after premature termination of a CSFB voice call.

FIG. 3 illustrates a signaling diagram for another example scenario in which a prior art wireless communication device can remain on a legacy network for an extended duration after premature termination of a CSFB voice call. In this regard, FIG. 3 illustrates an example in which a prior art UE 302 can operate in a network run by a network operator, such as China Mobile, which can require a device to fallback from 4G network 304 to 2G network 308 for servicing a voice call and which prevents reselection directly to 4G network 304 from 2G network 308. In this regard, the network operator in the example of FIG. 3 may only allow reselection to 3G network 306 from 2G network 308, and may only allow reselection to 4G network 304 from 3G network 306 such that the UE 302 may have to camp on 2G network 308 after premature termination of a CSFB voice call, then reselect to 3G network 306, and finally reselect to 4G network 304. The 4G network 304 can, for example, be an embodiment of the 4G network 102. The 2G network 308 and 3G network 306 can, for example, be respective embodiments of the legacy network 104.

The UE 302 may be connected to the 4G network 304, and may send or receive an extended service request (ESR) message in response to initiation of a voice call, at operation 310. For example, if a user of the UE 302 initiates a voice call such that the voice call is a mobile originated (MO) voice call from the perspective of the UE 302, the UE 302 may send an ESR message to the 4G network 304. Alternatively, if a remote device initiates a voice call to the UE 302 such that the voice call a mobile terminated (MT) voice call from the perspective of the UE 302, the UE 302 may send an ESR message to the 4G network 304 indicating that MT CSFB is acceptable in response to signaling from the 4G network 304 notifying the UE 302 of the MT voice call.

The ESR message may trigger initiation of a CSFB procedure such that the UE 302 can transition to the 2G network 308 for servicing of the voice call in accordance with network operator specifications. The UE 302 can, in turn, fallback to the 2G network 308, at operation 315.

The voice call can prematurely terminate, as illustrated by operation 320. For example, premature termination can result from a user aborting the voice call (e.g., a user of the UE 302 or a user of the other device participating in the call) prior to completion of voice call establishment. As another example, premature termination can result from a failure of the CSFB procedure. As a further example, in some instances, the CSFB procedure and call establishment can be completed successfully, but a radio link failure can occur on the 2G network 308. As a result of the premature call termination, the UE 302 may not have an active RR connection.

Prior art devices, such as the UE 302, can be configured to respond to the premature call termination by camping on the 2G network 308 without first searching for the 4G network 304. As such, the UE 302 can perform a LAU/RAU on the 2G network 308, at operation 325.

As discussed previously, the network operator in the example of FIG. 3 may prohibit direct reselection from the 2G network 308 to the 4G network 304. As such, the UE 302 can attempt reselection from the 2G network 308 to the 3G network 306. Accordingly, the UE 302 can perform a measurement of the 3G network 306 and, provided any applicable reselection thresholds are met, can exchange appropriate reselection signaling with the 2G network 308, as illustrated by operation 330. The UE 302 can then reselect to the 3G network 306, at operation 335. Operation 340 can include the UE 302 performing LAU/RAU in the 3G network 306.

After completing reselection to the 3G network 306, the UE 302 can perform a measurement of the 4G network 304 and, provided any applicable reselection thresholds are met, can exchange appropriate reselection signaling with the 3G network 306, as illustrated by operation 345. Operation 350 can include the UE 302 reselecting to the 4G network 304. Attendant to reselection to the 4G network 304, the UE 302 can perform a TAU in the 4G network 304, as illustrated by operation 355.

During the period including operations 325-345, the UE 302 can suffer from low throughput for any data communications due to the lower data rates offered by the 2G network 308 and the 3G network 306 compared to the 4G network 304. In this regard, experiments performed by the inventor demonstrated that on average it take 18.65 seconds for the UE 302 to return to the 4G network 304 after first camping on the 2G network 308 following the premature call termination, and user experience can be degraded by lower data rates during this time period. Further, the performance of LAU/RAU and measurement and reselection operations on the 2G network 308 and 3G network 306 in addition to TAU on the 4G network 304 can increase battery consumption and network signaling overhead.

Some example embodiments address the issues illustrated in and described with respect to FIGS. 2 and 3 by providing a wireless communication device configured to perform a self fast return directly to a first network, such as an LTE network or other 4G network, from which a CSFB was performed in response to premature termination of a CSFB voice call. Accordingly, rather than first camping on a legacy network(s) and then reselecting to the first network, the wireless communication device of such example embodiments can return directly to the first network.

For example, the wireless communication device of some such embodiments can be configured to store cell information for a first network. If there is a premature termination of a voice call that prompted a CSFB procedure to transition from the first network to a second network for servicing of the voice call, the wireless communication device of such example embodiments can use the stored cell information to scan for a first network cell before camping on the second network. If a first network cell is found, the wireless communication device can return directly to the first network without first camping on the second network, thus reducing battery consumption, signaling overhead, and the amount of time in which the device is not pageable, while also improving user experience by more quickly providing the faster data rates that may be offered by the first network. If, however, a first network cell is not found within a maximum scan time period following the premature call termination, the wireless communication device of some example embodiments may camp on the second network and reselect to the first network as conditions may permit.

Thus in the example of FIG. 2, operations 225-235 could be eliminated, as a wireless communication device provided by some example embodiments could be configured to return directly to the 4G network 204. Similarly, in the example of FIG. 3, operations 325-345 could be eliminated, as a wireless communication device provided by some example embodiments could be configured to return directly to the 4G network 304. Accordingly, users can benefit from higher throughput more quickly after premature termination of a CSFB voice call. For example, it may take less than 1 second to camp directly on the 4G network 304 in accordance with some example embodiments such that a user does not have to suffer through lower data rates for over 18 seconds as with the prior art scenario described with respect to FIG. 3. Some example embodiments can further provide the benefit of reduced battery consumption through elimination of additional measurement and signaling overhead necessary to support reselection. Further, the likelihood of a missed page may be reduced as time during reselection processes in which a wireless communication device may not be pageable can be reduced.

These and other embodiments are discussed below with reference to FIGS. 4-9. However, those skilled in the art will readily appreciate that the detailed description given herein with respect to these Figures is for explanatory purposes only and should not be construed as limiting.

Figure 4:
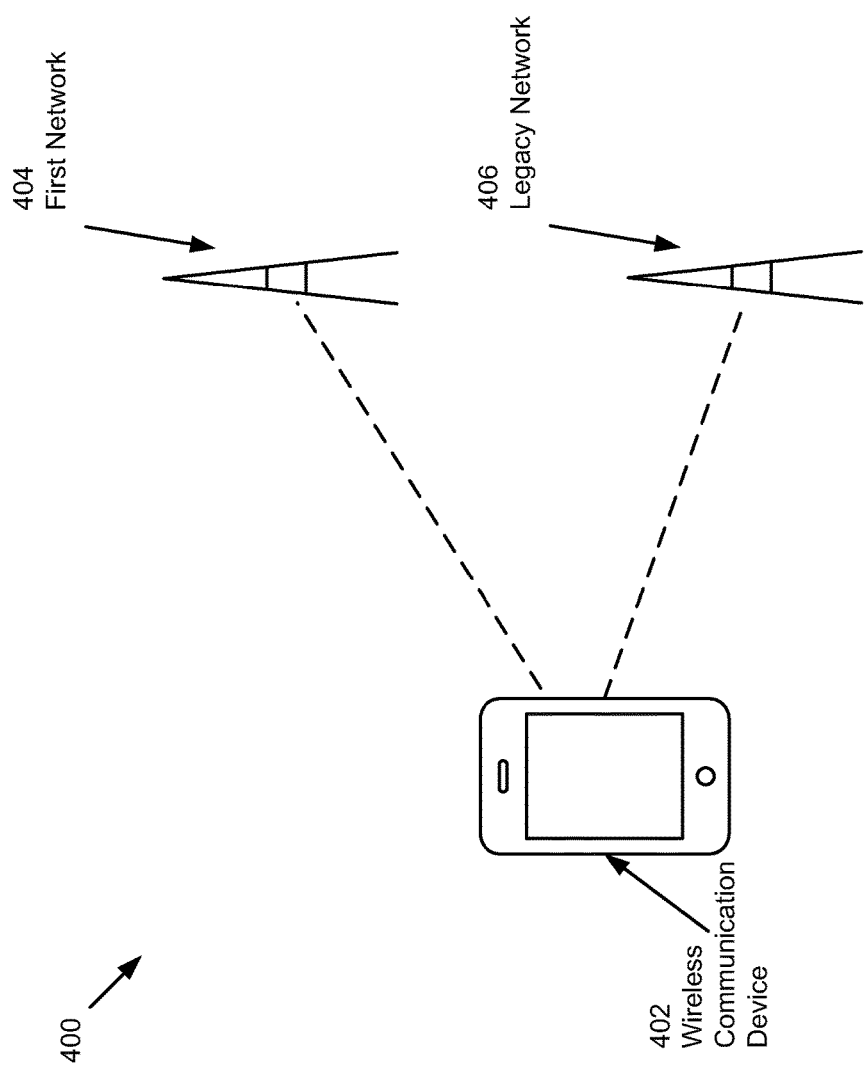
FIG. 4 illustrates an example system having multiple wireless communication networks to which a wireless communication device can connect in accordance with some example embodiments.

FIG. 4 illustrates an example system 400 having multiple wireless communication networks to which a wireless communication device 402 can connect in accordance with some example embodiments. By way of non-limiting example, the wireless communication device 402 can be a cellular phone, such as a smart phone device; a tablet computing device; a laptop computing device; or other computing device configured to operate within both a first network 404 and a legacy network 406. The wireless communication device 402 can also be referred to as user equipment (UE), such as in embodiments in which the wireless communication device 402 is configured to operate on an LTE network and/or other network using a RAT that can be standardized by the Third Generation Partnership Project (3GPP).

The first network 404 can be any network supporting packet switched (PS) data sessions and offering higher theoretical data rates than the legacy network 406, but that does not support CS voice calls. Thus, for example, the first network 404 can be an LTE network, which may use an LTE RAT, such as various LTE and/or LTE-Advanced (LTE) standards, or other 4G network, such as the 4G network 102 illustrated in FIG. 1. It will be appreciated, however, that the first network 404 is not limited to embodiment as an LTE or other 4G network. For example, the first network 404 may use a 5G RAT now in development and/or other present or future developed RAT that does not include a CS domain for supporting voice calls but that supports faster theoretical data rates than the legacy network 406.

The legacy network 406 can be any network having a CS domain to support CS voice calls. By way of non-limiting example, the legacy network 406 can be a UMTS network, a 3GPP2 network, or other 3G network. As a further example, the legacy network 406 can be a GSM or other 2G network. It will be appreciated, however, that the legacy network 406 is not limited to embodiment as a 2G or 3G network, and may be embodied as any legacy network that can support CS voice calls. In this regard, the legacy network 406 can be an embodiment of the legacy network 104.

As illustrated in FIG. 4, the wireless communication device 402 can be within signaling range of both a cell (e.g., a base station or other access point) for the first network 404 and a cell (e.g., a base station or other access point) for the legacy network 406. In this regard, the wireless communication device 402 can be located in a region of overlapping coverage of the first network 404 and the legacy network 406. Accordingly, the wireless communication device 402 can connect to the first network 404. In response to initiation of a voice call (e.g., a mobile originating voice call initiated by the wireless communication device 402 or a mobile terminating voice call placed to the wireless communication device 402), the wireless communication device 402 can participate in a CSFB procedure to the legacy network 406 so that the voice call can be serviced via the CS domain of the legacy network 406. The CSFB procedure can, for example, be performed as defined in Third Generation Partnership Project (3GPP) TS 23.272 Version 11.2.0 (Sep. 14, 2002), the contents of which are disclosed herein by reference in its entirety. It will be appreciated, however, that the CSFB procedure can additionally or alternatively be performed in accordance with one or more previous and/or future versions of 3GPP TS 23.272. Further, in some example embodiments, the CSFB procedure can be performed in accordance with existing or future methodologies for performing a CSFB procedure that may be performed or promulgated by bodies other than 3GPP.

Figure 5:
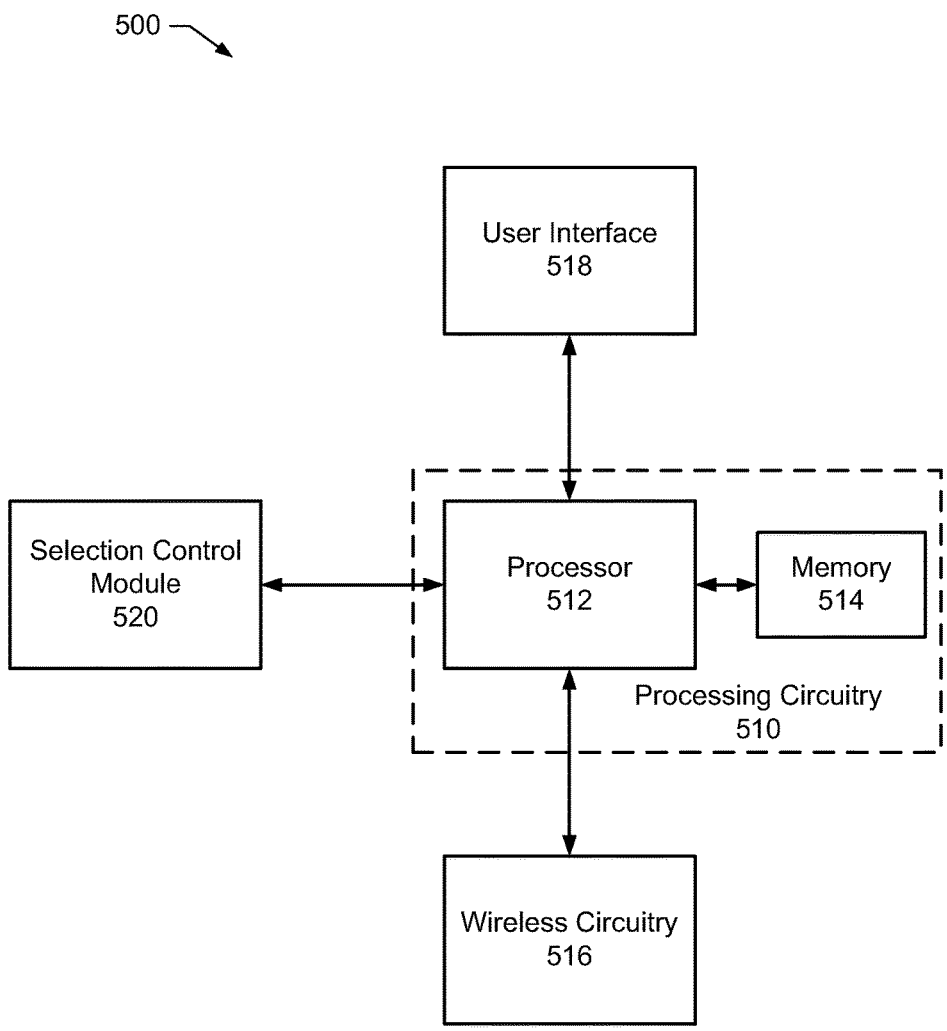
FIG. 5 illustrates a block diagram of an apparatus that can be implemented on a wireless communication device in accordance with some example embodiments.

FIG. 5 illustrates a block diagram of an apparatus 500 that can be implemented on a wireless communication device, such as wireless communication device 402, in accordance with some example embodiments.

In this regard, when implemented on a computing device, apparatus 500 can enable the computing device to operate as a wireless communication device 402 within the system 400 in accordance with one or more example embodiments. It will be appreciated that the components, devices or elements illustrated in and described with respect to FIG. 5 below may not be mandatory and thus some may be omitted in certain embodiments. Additionally, some embodiments can include further or different components, devices or elements beyond those illustrated in and described with respect to FIG. 5.

In some example embodiments, the apparatus 500 can include processing circuitry 510 that is configurable to perform actions in accordance with one or more example embodiments disclosed herein. In this regard, the processing circuitry 510 can be configured to perform and/or control performance of one or more functionalities of the apparatus 500 in accordance with various example embodiments, and thus can provide means for performing functionalities of the wireless communication device 402 in accordance with various example embodiments. The processing circuitry 510 can be configured to perform data processing, application execution and/or other processing and management services according to one or more example embodiments.

In some embodiments, the apparatus 500 or a portion(s) or component(s) thereof, such as the processing circuitry 510, can include one or more chipsets, which can each include one or more chips. The processing circuitry 510 and/or one or more further components of the apparatus 500 can therefore, in some instances, be configured to implement an embodiment on a single chip or chipset. In some example embodiments in which one or more components of the apparatus 500 are embodied as a chipset, the chipset can be capable of enabling a computing device to operate as a wireless communication device 402 in the system 400 when implemented on or otherwise operably coupled to the computing device. Thus, for example, one or more components of the apparatus 500 can provide a chipset, such as a cellular baseband chipset, configured to enable a computing device to operate over one or more cellular networks, such as first network 404 and legacy network 406.

In some example embodiments, the processing circuitry 510 can include a processor 512 and, in some embodiments, such as that illustrated in FIG. 5, can further include memory 514. The processing circuitry 510 can be in communication with or otherwise control wireless circuitry 516, user interface 518, and/or selection control module 520.

The processor 512 can be embodied in a variety of forms. For example, the processor 512 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of wireless communication device 402 as described herein. In some example embodiments, the processor 512 can be configured to execute instructions that can be stored in the memory 514 or that can be otherwise accessible to the processor 512. As such, whether configured by hardware or by a combination of hardware and software, the processor 512 capable of performing operations according to various embodiments while configured accordingly.

In some example embodiments, the memory 514 can include one or more memory devices. Memory 514 can include fixed and/or removable memory devices. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the apparatus 500 to carry out various functions in accordance with one or more example embodiments. In some embodiments, the memory 514 can be in communication with one or more of the processor 512, wireless circuitry 516, user interface 518, or selection control module 520 via one or more buses for passing information among components of the apparatus 500.

The apparatus 500 can further include wireless circuitry 516. The wireless circuitry 516 can be configured to enable the wireless communication device 402 to send wireless signals to and receive signals from one or more wireless networks, such as the first network 404 and legacy network 406. The wireless circuitry 516 can, for example, include a transceiver (or multiple transceivers) and supporting hardware and/or software for enabling communications with the first network 404 and legacy network 406. As such, the wireless circuitry 516 can be configured to support communication via any type of RAT that may be implemented by the first network 404 and legacy network 406.

The apparatus 500 can additionally include a user interface 518. The user interface 518 can be in communication with the processing circuitry 510 to receive an indication of a user input and/or to provide an audible, visual, mechanical, or other output to a user. As such, the user interface 518 may include, for example, one or more buttons, a keypad, a joystick, a display, a touch screen display, a microphone, a speaker, a camera, and/or other input/output mechanisms. For example, the user interface 518 can include an input mechanism(s) configured to enable a user to initiate and/or abort a voice call.

The apparatus 500 can further include selection control module 520. The selection control module 520 can be embodied as various means, such as circuitry, hardware, a computer program product comprising a computer readable medium (for example, the memory 514) storing computer readable program instructions that are executable by a processing device (for example, the processor 512), or some combination thereof. In some embodiments, the processor 512 (or the processing circuitry 510) can include, or otherwise control the selection control module 520. The selection control module 520 can be configured to perform operations enabling the wireless communication device 402 to return to the first network 404 following premature termination of a CSFB voice call in accordance with various example embodiments disclosed herein.

For example, the selection control module 520 of some example embodiments can be configured to store cell information (e.g., in memory 514) for one or more cells of the first network 404 that may be known to the wireless communication device 402. In the event of a premature termination of a CSFB voice call, the selection control module 520 can be configured to use the stored cell information to scan for a cell of the first network 404 to enable return to the first network 404 rather than camping on the legacy network 406 after the premature termination of the CSFB voice call. For example, the stored cell information can include one or more of frequency information for a cell of the first network 404 on which the wireless communication device 402 was camped when the CSFB procedure was initiated, neighbor cell information for one or more neighbor first network 404 cells broadcast by the cell of the first network 404 on which the wireless communication device was camped when the CSFB procedure was initiated, or frequency information for one or more cells of the first network 404 previously identified by the wireless communication device 402, such as through performance of measurements or frequency scans prior to initiation of the CSFB procedure. In this regard, the stored cell information may be used by the selection control module 520 to quickly identify a cell of the first network 404 that may have coverage area including the location of the wireless communication device 402 such that the wireless communication device 402 can return to the first network 404.

Figure 6:
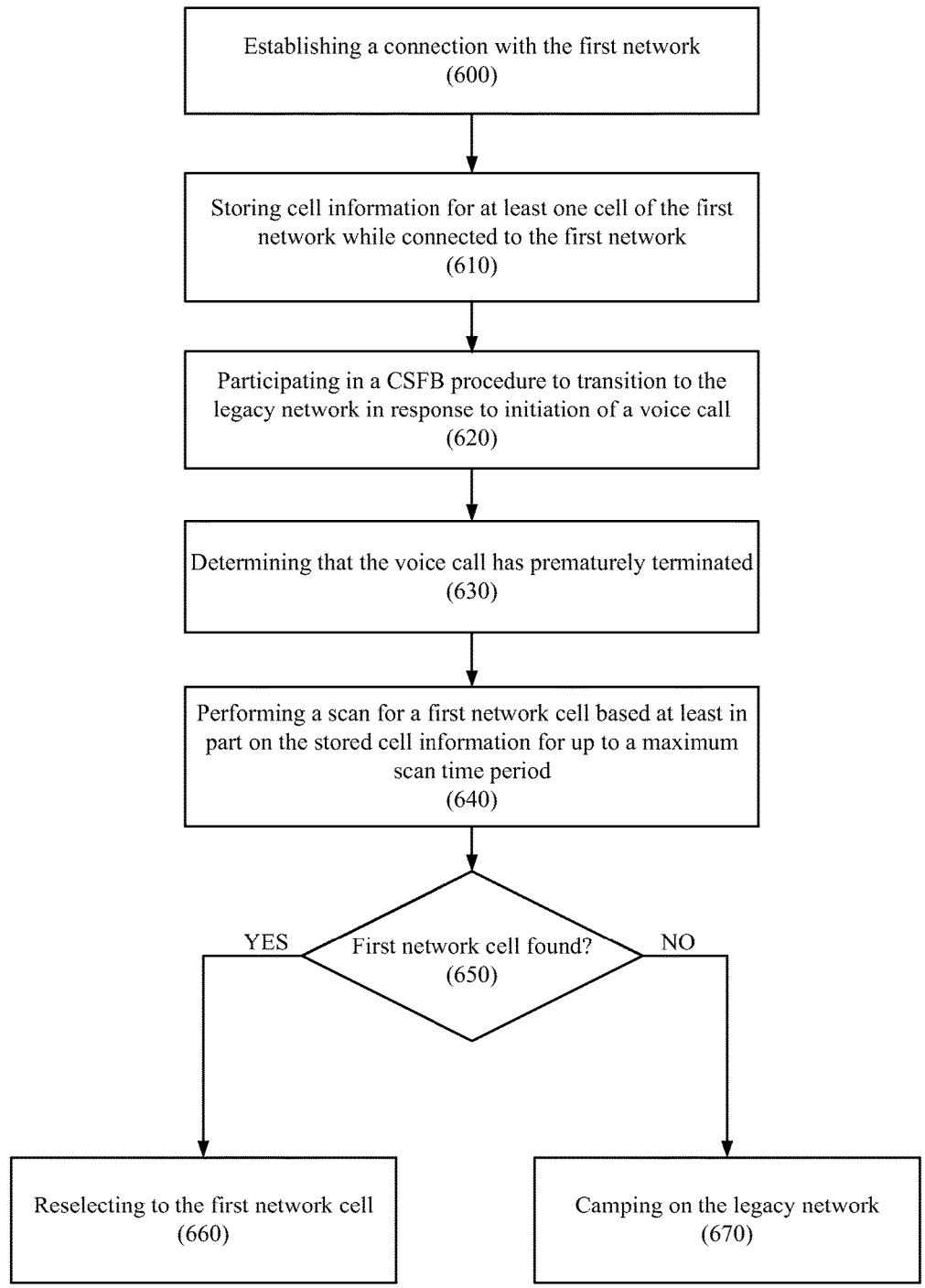
FIG. 6 illustrates a flowchart according to an example method for returning to a first network from a legacy network after premature termination of a CSFB voice call in accordance with some example embodiments.

FIG. 6 illustrates a flowchart according to an example method for returning to the first network 404 from the legacy network 406 after premature termination of a CSFB voice call in accordance with some example embodiments. In this regard, FIG. 6 illustrates operations that can be performed by the wireless communication device 402 of some example embodiments. One or more of processing circuitry 510, processor 512, memory 514, wireless circuitry 516, user interface 518, or selection control module 520 can, for example, provide means for performing one or more of the operations illustrated in and described with respect to FIG. 6.

Operation 600 can include the wireless communication device 402 establishing a connection with the first network 404. In this regard, the wireless communication device 402 can camp on one or more cells of the first network 404.

Operation 610 can include the wireless communication device 402 storing, such as in memory 514, cell information for at least one cell of the first network 404 while connected to the first network 404. The stored cell information can include any information that can be used to identify a cell (e.g., via scanning) and/or to establish a connection with and camp on a cell. In some example embodiments, the stored cell information can include frequency information for one or more cells of the first network 404 that are known to the wireless communication device 402.

For example, the wireless communication device 402 of some example embodiments can store frequency information for one or more cells of the first network 404 on which the wireless communication device 402 has camped, including, for example, a present cell on which the wireless communication device 402 may be camped. As a further example, the wireless communication device 402 of some example embodiments can be configured to store frequency information and/or other cell information for one or more neighbor cells of a cell on which the wireless communication device 402 is camped. This neighbor cell information may, for example, be broadcast by the cell (e.g., by a serving base station associated with the cell). As still an additional example, the stored cell information can include frequency information and/or other cell information for one or more cells of the first network 404 that may have been previously identified by the wireless communication device 402, such as through performance of measurements and/or frequency scans.

Operation 620 can include the wireless communication device 402 participating in a CSFB procedure to transition to the legacy network 406 in response to initiation of a voice call. The voice call can, for example, be a mobile originated voice call initiated by a user of the wireless communication device 402. Alternatively, the voice call can be a mobile terminated voice call placed to the wireless communication device 402 by another device.

The voice call can prematurely terminate. Operation 630 can include the wireless communication device 402 determining that the voice call has prematurely terminated in a manner that has left the wireless communication device 402 without an active RR connection on either the first network 404 or the legacy network 406. The voice call can terminate due to a variety of conditions that may leave the wireless communication device 402 without an active RR connection.

For example, if the voice call was aborted, operation 630 can include determining that the voice call was aborted prior to completion of voice call establishment. In an instance in which the voice call was aborted by a user of the wireless communication device 402, operation 630 can include determining that the voice call has prematurely terminated based at least in part on user input aborting the voice call that can be received via user interface 518.

As a further example, in some instances, the voice call can prematurely terminate due to failure of the CSFB procedure such that the wireless communication device 402 does not complete fallback to the legacy network 406. In such instances, operation 630 can include the wireless communication device 402 determining that the CSFB procedure failed.

As another example, in some instances the voice call can prematurely terminate after completion of the CSFB procedure and call establishment, such as due to a radio link failure on the legacy network 406. In such instances, operation 630 can include the wireless communication device 402 determining that a radio link failure occurred on the legacy network 406.

Operation 640 can include the wireless communication device 402 performing a scan for a first network 404 cell based at least in part on the stored cell information for up to a maximum scan time period. For example, in embodiments in which the stored cell information includes frequency information for one or more cells of the first network 404 that are known to the wireless communication device 402, operation 640 can include performing a scan of one or more frequencies defined by the frequency information. If the frequency information includes frequency information for the cell of the first network 404 on which the wireless communication device 402 was camped when the CSFB procedure was initiated, operation 640 can include scanning for the last cell of the first network 404 on which the wireless communication device 402 was camped. As still a further example, if the frequency information includes neighbor cell information for one or more neighbor cells of the cell of the first network 404 on which the wireless communication device 402 was camped when the CSFB procedure was initiated, operation 640 can include scanning for the neighbor cells. In this regard, the stored cell information can include information for one or more cells that are likely to cover an area in which the wireless communication device 402 is operating such that the wireless communication device 402 can use the stored cell information to perform a targeted scan of frequencies known to be associated with cells to facilitate more rapid identification of a cell on the first network 404.

Operation 650 can comprise the wireless communication device 402 determining whether a cell of the first network 404 was found within the maximum scan time period. In an instance in which a cell of the first network 404 is identified within the maximum scan time period by the scan of operation 640, the method can proceed to operation 650, which can include the wireless communication device 402 reselecting to the identified cell of the first network 404. If, however, a cell of the first network 404 is not identified within the maximum scan time period by the scan of operation 640, the wireless communication device 402 can instead camp on the legacy network 406. After camping on the legacy network 406, the wireless communication device 402 can later reselect to the first network 404 if a cell satisfying any applicable measurement/reselection threshold(s) is found.

The maximum scan time period that can be applied in operation 640 can accordingly be used to impose an upper limit on the amount of time spent scanning for a first network 404 cell before the wireless communication device 402 can elect to instead camp on the legacy network 406. In some example embodiments, the maximum scan time period can be a static time period that can be used globally. Alternatively, in some example embodiments, the length of the maximum scan time period can vary depending on various operating conditions of the wireless communication device 402.

For example, in some embodiments, the length of the maximum scan time period can be defined based at least in part on a deployment density of the first network 404 within a region in which the wireless communication device 402 is operating. The deployment density can, for example, be defined in terms of a number of cells of the first network 404 (e.g., an average number of cells) deployed per unit of area (e.g., square mile, square kilometer, hectare, etc.) within the region. As another example, the deployment density can be defined in terms of a percentage of the region that is covered by the first network 404. The region can, for example, be a politically defined region (e.g., a country, state, province, city, town, etc.), a region defined based at least in part by an area of coverage of a network operator's network, or other region that can be defined by geographic boundaries inclusive of a location of the wireless communication device 402. The length of the time period can, for example, have a direct correlation to the deployment density of the first network 404. Thus, for example, in a region in which deployment density is greater, a longer maximum scan time period can be used, whereas in a region in which deployment density is sparser, a shorter maximum scan time period can be used. As a non-limiting example, in some embodiments in which the first network 404 is embodied as an LTE network, given that LTE deployment density in the United States is presently greater than in China, a time period (e.g., 2 seconds) that can be used in the United States can be longer than a time period (e.g., 1 second) that can be used in China. In this regard, given a region of higher deployment density, the likelihood of finding a cell of the first network 404 can be higher and a longer maximum scan time can be applied.

In some example embodiments in which the length of the maximum scan time period can be defined based at least in part on the regional deployment density of the first network 404, the wireless communication device 402 can be provisioned with an appropriate maximum scan time period length by a network operator, device vendor, device manufacturer, and/or other entity that may be associated with manufacture of, distribution of, and/or provision of services to the wireless communication device 402. For example, the wireless communication device 402 can be provisioned with a maximum scan time period length at time of manufacture or sale that is appropriate for an intended region of operation of the wireless communication device 402. Additionally or alternatively, the wireless communication device 402 can be provisioned with the maximum scan time period length by the serving network, such as in response to a query by the wireless communication device 402 and/or in response to the wireless communication device 402 camping on the first network 404.

Additionally or alternatively, in some example embodiments in which the length of the maximum scan time period can be defined based at least in part on regional deployment density of the first network 404, the wireless communication device 402 can be provided with deployment density information for the region of operation by a serving network. The wireless communication device 402 can use the received deployment density information to select an appropriate maximum scan time period length. For example, the wireless communication device 402 can have a reference table and/or other data structure storing correlations between various deployment densities and/or deployment density ranges and respective maximum scan time period lengths.

As a further example, in some embodiments in which the length of the maximum scan time period can be defined based at least in part on regional deployment density of the first network 404, the wireless communication device 402 can be configured to determine its region of operation and select the maximum scan time period length based at least in part on the region. In this regard, the wireless communication device 402 of such example embodiments can access a lookup table (e.g., a locally stored lookup table or a lookup table that may be remotely accessible over a network), which may store predefined correlations between regions/locations and respective maximum scan time period lengths and/or deployment densities. The wireless communication device 402 can accordingly use the correlated maximum scan time period lengths and/or deployment densities to select an appropriate maximum scan time period length for use in the scan that can be performed in operation 640.

It will be appreciated that the wireless communication device 402 can use any available method to determine its region of operation. For example, the wireless communication device 402 of some such embodiments can include a satellite positioning service sensor, such as a Global Positioning System (GPS) sensor, Beidou navigation system sensor, Compass navigation system sensor, Galileo positioning system sensor, Global Navigation Satellite System (GLONASS) sensor, and/or other satellite positioning service sensor that can be used to determine a location of the wireless communication device 402. As a further example, the wireless communication device 402 can use various techniques to derive an estimated location, such as various assisted GPS techniques, cell triangulation techniques, and/or the like. As another example, the wireless communication device 402 can receive a location indication that can be broadcast by a network, such as a wireless local area network (WLAN) that may be within range of the wireless communication device 402. As yet another example, the wireless communication device 402 can determine a region of operation based at least in part on information that can be broadcast by a serving cell and/or other cell within range of the wireless communication device 402, such as by way of non-limiting example, cell ID, mobile country code (MCC), and/or other location/site specific information that can be broadcast within a cell of a cellular network.

In some example embodiments, the wireless communication device 402 can be configured to select the length of the maximum scan time period that can be applied in operation 640 based at least in part on a mobility state of the wireless communication device 402. The mobility state of the wireless communication device 402 can include any quantifiable mobility characteristic of the wireless communication device 402. For example, the mobility state can be a distance traveled by the wireless communication device 402 since initiation of the CSFB procedure at operation 620. As another example, the mobility state can be a velocity of the wireless communication device 402, such as an average velocity since initiation of the CSFB procedure at operation 620, an instantaneous velocity (e.g., when initiating the scan performed at operation 640), a maximum instantaneous velocity in the time elapsed since initiation of the CSFB procedure at operation 620, and/or other instantaneous and/or average velocity measurement. The wireless communication device 402 can be configured to use any available location and/or motion detection sensing technique, including, for example, a satellite positioning service sensor, accelerometer, gyroscope, comparison of a series of two or more derived locations (e.g., as may be derived through cell triangulation, WLAN sensing, and/or other techniques that may be used to estimate a location of the wireless communication device 402), some combination thereof, or the like, to determine the mobility state.

In embodiments in which the length of the maximum scan time period is selected based at least in part on the mobility state, the maximum scan time period length can be inversely correlated to the mobility state. For example, if the mobility state is less than a threshold, such as if a distance traveled is less than a displacement threshold and/or if a measured velocity is less than a threshold velocity, a first maximum scan time period length can be selected, while if the mobility state is not less than the threshold, such as if a distance traveled exceeds a displacement threshold and/or if a measured velocity does exceeds a threshold velocity, a second maximum scan time period length can be selected. The first maximum scan time period length can be longer than the second maximum scan time period length. In this regard, if a mobility state exceeds the threshold, there can be an increased likelihood that the wireless communication device 402 has moved out of range of one or more cells of the first network 404 for which cell information was stored, thus decreasing the likelihood of reacquiring a first network 404 cell based on the stored cell information. As such, a lower amount of time can be spent scanning in operation 640 before camping on the legacy network 406 if a first network 404 cell is not found. However, if the mobility state is low, there is a greater likelihood that the wireless communication device 402 is within the coverage area of one or more cells of the first network 404 for which cell information was stored, and a greater amount of time can be spent trying to identify a first network 404 cell based at least in part on the stored cell information.

In some example embodiments, the length of the maximum scan time period can be defined based at least in part on a combination of a mobility state and regional deployment density. For example, in some such embodiments, a base maximum scan time period length can be defined based on deployment density of the first network 404 within the region in which the wireless communication device 402 is operating, and an offset can be applied to the base maximum scan time period length based on the mobility state. For example, if the mobility state is low (e.g., less than a threshold), the base maximum scan time period length can be increased by an offset. However, if the mobility state is high (e.g., greater than a threshold), the base maximum scan time period length can be decreased by an offset.

Figure 7:
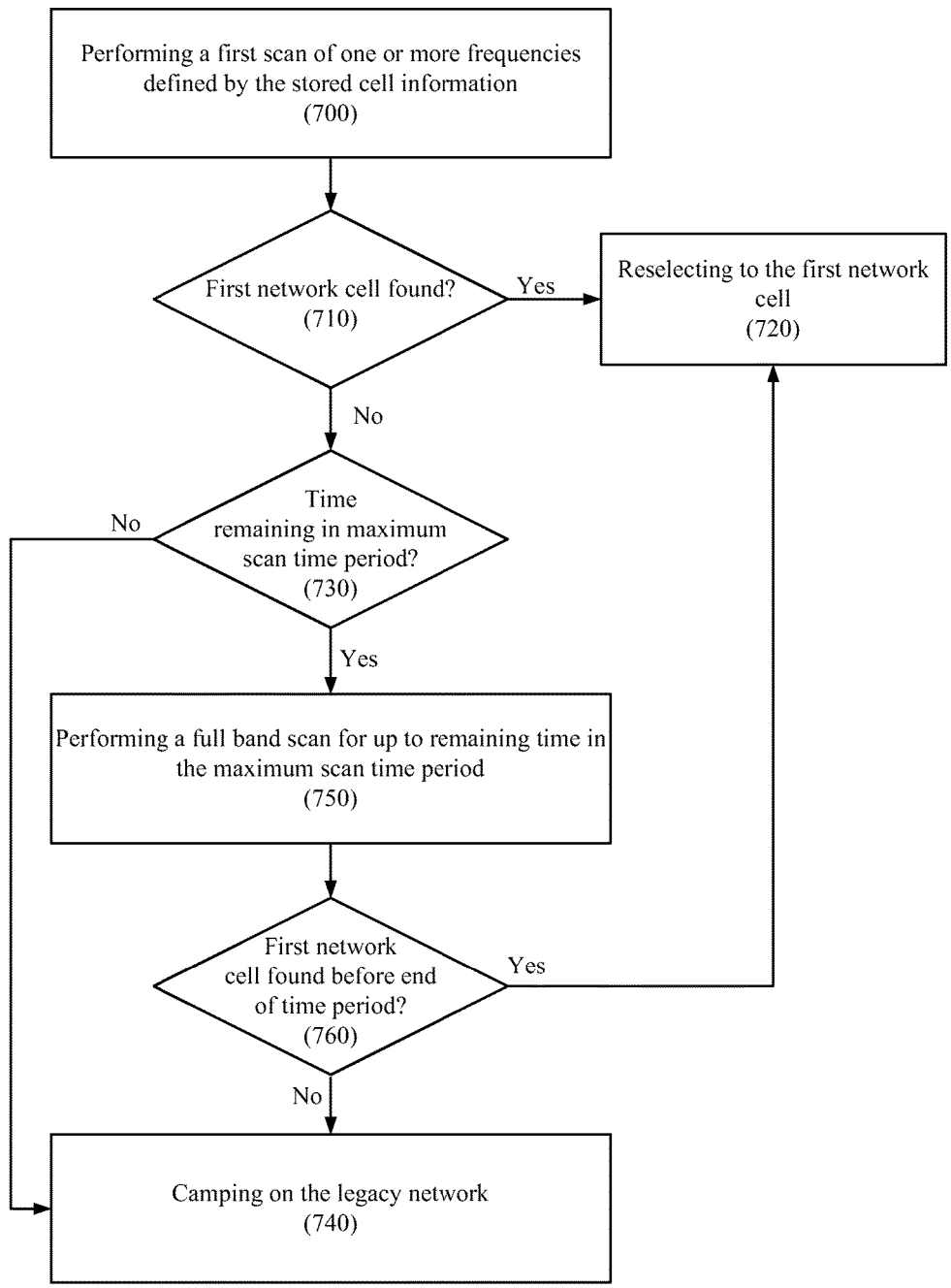
FIG. 7 illustrates a flowchart according to an example method for performing a scan and selecting a network after premature termination of a CSFB voice call in accordance with some example embodiments.

In some example embodiments, performance of the scan of operation 640 can include the wireless communication device 402 first scanning based on the stored cell information. If the scan based on the stored cell information is completed and the maximum scan time period has not elapsed, the wireless communication device 402 can perform at least a partial full band scan until either a first network 404 cell is identified or the maximum scan time period has elapsed. An example of such embodiments is illustrated in FIG. 7. In this regard, FIG. 7 illustrates an example method for performing a scan and selecting a network that can be used to perform operations 640-670 as illustrated in and described above with respect to FIG. 6. One or more of processing circuitry 510, processor 512, memory 514, wireless circuitry 516, user interface 518, or selection control module 520 can, for example, provide means for performing one or more of the operations illustrated in and described with respect to FIG. 7.

Operation 700 can comprise the wireless communication device 402 performing a first scan of one or more frequencies defined by the stored cell information. In this regard, operation 700 corresponds to a first phase of the scan of operation 640 in which the scan can be divided into multiple phases, beginning with a first scan phased based on the stored cell information.

Operation 710 can comprise the wireless communication device 402 determining whether a first network 404 cell was found by the first scan. If a first network 404 was identified by the first scan, the method can proceed to operation 720, which can include the wireless communication device 302 reselecting to the identified cell of the first network 404. In this regard, operation 720 can, for example, correspond to an embodiment of operation 660.

If, however, it is determined in operation 720 that a cell of the first network 404 was not found by the first scan, the method can instead proceed to operation 730, which can comprise determining whether there is any time remaining in the maximum scan time period. If there is not any time remaining in the maximum scan time period, the method can proceed to operation 740, which can comprise camping on the legacy network 406. Operation 740 can, for example, comprise an embodiment of operation 670.

If, however, there is time remaining in the maximum scan time period, the method can instead proceed to operation 750, which can include the wireless communication device 402 performing a full band scan for up to the duration of remaining time in the maximum scan time period. In this regard, performance of the full band scan can comprise a second phase of the scan described with respect to operation 640 that can optionally be performed if a cell of the first network 404 is not found by scanning based on the stored cell information and there is still time remaining in the maximum scan time period. Performance of the full band scan can, for example, comprise iteratively scanning frequencies in a band(s) in which the RAT used by the first network 404 can operate. In this regard, the full band scan can be a bind scan that is not targeted to a specific frequency or frequencies that may be defined by the stored cell information.

Performance of the full band scan can be terminated when either a cell of the first network 404 is found or the maximum scan time period expires. Operation 760 can comprise the wireless communication device 402 determining whether a cell of the first network 404 was found before the end of the maximum scan time period. In an instance in which a cell of the first network 404 is identified, the method can proceed to operation 720, and the wireless communication device 402 can reselect to the identified cell of the first network 404. If, however, a cell of the first network 404 is not identified within the maximum scan time period, the method can instead proceed to operation 740, and the wireless communication device 402 can camp on the legacy network 406.

As discussed previously, the likelihood of finding a cell of the first network 404 after premature termination of a CSFB voice call can be impacted by mobility of the wireless communication device 402 since initiation of the CSFB procedure. In this regard, if the wireless communication device 402 is in a high state of mobility after initiation of the CSFB procedure, such as if a velocity of the wireless communication device 402 exceeds a threshold and/or if a distance traveled by the wireless communication device 402 since initiation of the CSFB procedure exceeds a displacement threshold, there can be an increased likelihood that the wireless communication device 402 has moved out of range of one or more cells of the first network 404 for which cell information was stored, thus decreasing the likelihood of reacquiring a first network 404 cell based on the stored cell information. In some example embodiments, if a mobility state of the wireless communication device 402 since initiation of the CSFB procedure exceeds a threshold, the wireless communication device 402 can omit scanning for the first network 404, and can camp directly on the legacy network 406.

Figure 8:
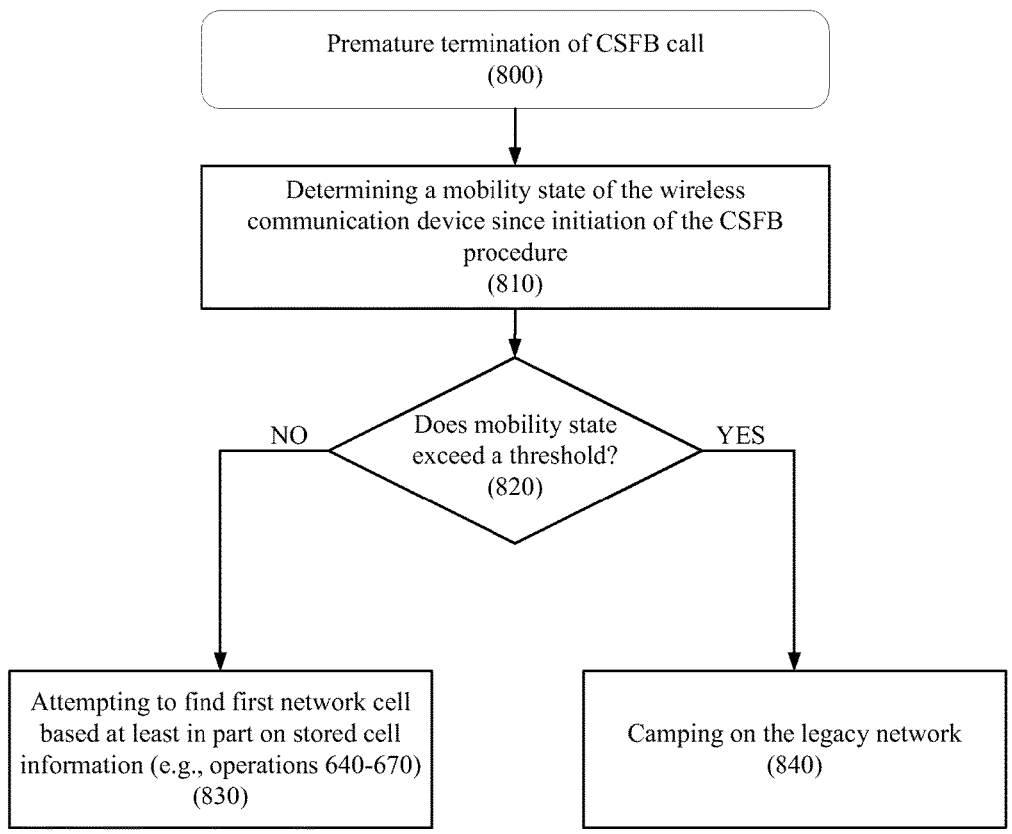
FIG. 8 illustrates a flowchart according to an example method for selecting a network after premature termination of a CSFB voice call based at least in part on a device mobility state in accordance with some example embodiments.

FIG. 8 illustrates a flowchart according to an example method for selecting a network after premature termination of a CSFB voice call based at least in part on a device mobility state in accordance with some example embodiments in which the wireless communication device 402 can omit scanning for the first network 404 and camp directly on the legacy network 406 if the mobility state of the wireless communication device 402 since initiation of the CSFB procedure exceeds a threshold. One or more of processing circuitry 510, processor 512, memory 514, wireless circuitry 516, user interface 518, or selection control module 520 can, for example, provide means for performing one or more of the operations illustrated in and described with respect to FIG. 8.

Operation 800 can include determining that a premature termination of a CSFB call has occurred. In this regard, operation 800 can, for example, correspond to an embodiment of operation 630. Operation 810 can include the wireless communication device 402 determining a mobility state of the wireless communication device 402 since initiation of the CSFB procedure. The wireless communication device 402 can compare the determined mobility state to a threshold mobility state and determine if the mobility state determined in operation 810 exceeds the threshold mobility state, at operation 820.

Provided that the mobility state determined in operation 810 does not exceed the threshold mobility state, the method can proceed to operation 830, which can include the wireless communication device 402 attempting to find a cell of the first network 404 based at least in part on stored cell information. In this regard, operation 830 can, for example, comprise performance of operations 640-670 and/or of the method of FIG. 7.

If, however, the mobility state determined in operation 810 does exceed the threshold mobility state, the method can instead proceed to operation 840, which can include the wireless communication device 402 camping on the legacy network 406 without first scanning for the first network 404. In this regard, given the reduced likelihood of finding a cell of the first network 404, the wireless communication device 402 can camp directly on the legacy network 406 so as to more rapidly provide data and/or other network services to the user.

Figure 9:
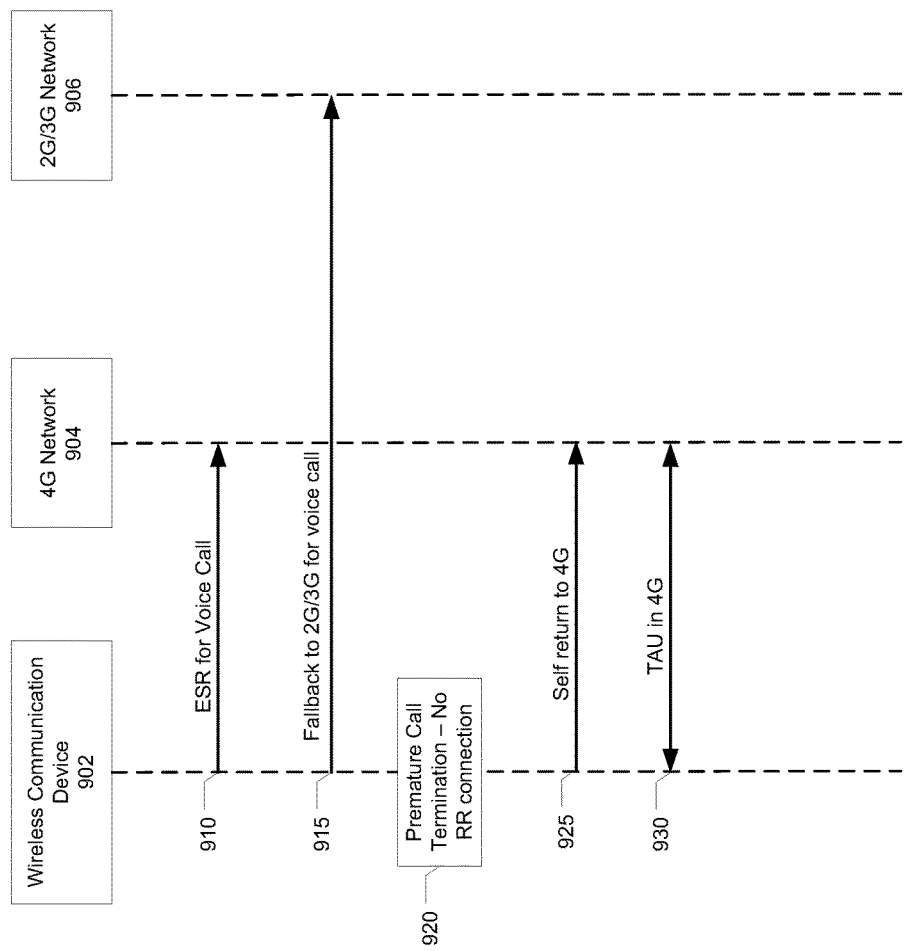
FIG. 9 illustrates a signaling diagram in accordance with an example method for returning to a first network from a legacy network after premature termination of a CSFB voice call in accordance with some example embodiments.

FIG. 9 illustrates a signaling diagram in accordance with an example method for returning to a first network from a legacy network after premature termination of a CSFB voice call in accordance with some example embodiments. In this regard, FIG. 9 illustrates signaling that can be exchanged between wireless communication device 902, a 4G network 904, and a 2G/3G network 906. The wireless communication device 902 can, for example, be an embodiment of wireless communication device 402. The 4G network 904 can, for example, be an embodiment of first network 404, while the 2G/3G network 906 can, for example, be an embodiment of the legacy network 406.

The wireless communication device 902 may be connected to the 4G network 904, and may send an ESR message in response to initiation of a voice call, at operation 910. For example, if a user of the wireless communication device 902 initiates a voice call such that the voice call is an MO voice call from the perspective of the wireless communication device 902, the wireless communication device 902 may send an ESR message to the 4G network 904. Alternatively, if a remote device initiates a voice call to the wireless communication device 902 such that the voice call an MT voice call from the perspective of the wireless communication device 902, the wireless communication device 902 may send an ESR message to the 4G network 904 indicating that MT CSFB is acceptable in response to signaling from the 4G network 904 notifying the wireless communication device 902 of the MT voice call. For example, if the wireless communication device 902 is in IDLE state on the 4G network 904, the 4G network 904 can page the wireless communication device 902 to notify the UE 902 of the MT voice call. As another example, if the wireless communication device 902 is in CONNECTED state on the 4G network 904, the 4G network 904 can send a CS service notification message to the wireless communication device 902 to notify the wireless communication device 902 of the MT voice call. Accordingly, for example, the wireless communication device 902 can send an ESR message to the 4G network 904 in response to a page or CS service notification message in the event of a MT voice call.

The ESR message may trigger initiation of a CSFB procedure such that the wireless communication device 902 can transition to the 2G/3G network 906 for servicing of the voice call. The wireless communication device 902 can, in turn, fallback to the 2G/3G network 906, at operation 915.

The voice call can prematurely terminate, as illustrated by operation 920. For example, premature termination can result from a user aborting the voice call (e.g., a user of the wireless communication device 902 or a user of the other device participating in the call) prior to completion of voice call establishment. As another example, premature termination can result from a failure of the CSFB procedure. As a further example, in some instances, the CSFB procedure and call establishment can be completed successfully, but a radio link failure can occur on the 2G/3G network 906. As a result of the premature call termination, the wireless communication device 902 may not have a radio resource (RR) connection on either of the 4G network 904 or the 2G/3G network 906. Further, due to premature termination of the voice call, the wireless communication device 902 does not receive a network redirection to the 4G network 904.

Operation 925 can comprise the wireless communication device 902 performing a self return to the 4G network 904 without first camping on the 2G/3G network 906 in response to the premature call termination in accordance with various example embodiments. For example, operation 925 can be accomplished in accordance with one or more of the methods illustrated in and described with respect to FIGS. 6-8. Operation 930 can include the wireless communication device 902 performing a TAU procedure in the 4G network 904 to complete the establishment of a connection with the 4G network 904.

Accordingly, in comparing FIG. 9 to the prior art scenario of FIG. 2, it can be seen that the wireless communication device 902 returns to the 4G network much more quickly following the premature call termination than the UE 202. Accordingly, a user of the wireless communication device 902 can benefit through better data rates. Further, the additional battery consumption and signaling overhead related to performance of operations 225-230 can be avoided. Similarly, comparing FIG. 9 to the prior art scenario of FIG. 3, it can be seen that the extended period encompassing operations 325-345 in which the UE 302 can suffer from lower data rates in the legacy networks as well as the additional battery consumption and signaling overhead related to performance of operations 325-345 can be avoided.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for returning to a Long Term Evolution (LTE) network from a legacy network after premature termination of a circuit switched fallback (CSFB) voice call, the method comprising a wireless communication device:
    establishing a connection with the LTE network;
    storing cell information for at least one cell of the LTE network while connected to the LTE network;
    participating in a CSFB procedure to transition the wireless communication device from the LTE network to the legacy network in response to initiation of a voice call, wherein the legacy network has a circuit switched domain configured to service the voice call;
    determining that the voice call has prematurely terminated, wherein the wireless communication device does not have an active radio resource connection on either of the LTE network or the legacy network as a result of premature termination of the voice call; and
    in response to premature termination of the voice call:
        performing a scan for one or more cells of the LTE network based at least in part on stored cell information for up to a maximum scan time period;
        reselecting to a cell of the LTE network in an instance in which at least one cell of the LTE network is identified by the scan within the maximum scan time period; and
        camping on the legacy network in an instance in which no cell of the LTE network is identified by the scan within the maximum scan time period,
    wherein a length of the maximum scan time period comprises:
        a base maximum scan time period length based on LTE deployment density within a region in which the wireless communication device is operating, and
        an offset applied to the base maximum scan time period length, the offset based on a mobility state of the wireless communication device.

2. The method of claim 1, wherein:
    storing cell information comprises storing frequency information for the at least one LTE cell of the LTE network; and
    performing the scan for the one or more cells of the LTE network based at least in part on stored cell information comprises:
        performing a first scan of one or more frequencies defined by the frequency information; and
        in an instance in which no cell of the LTE network is found by the first scan, performing a full band scan for up to a duration of any time remaining in the maximum scan time period after completion of the first scan.

3. The method of claim 1, wherein storing cell information comprises storing one or more of:
    frequency information for a cell of the LTE network on which the wireless communication device was camped when the CSFB procedure was initiated,
    neighbor cell information for one or more neighbor cells of the LTE network broadcast by the cell of the LTE network on which the wireless communication device was camped when the CSFB procedure was initiated, or
    frequency information for one or more cells of the LTE network previously identified by the wireless communication device.

4. The method of claim 1, wherein the base maximum scan time period length is:
    increased by the offset when the mobility state does not exceed a threshold, and
    decreased by the offset when the mobility state exceeds the threshold.

5. The method of claim 1, further comprising the wireless communication device receiving, from a serving network, one or more of:
    the base maximum scan time period length, or
    LTE deployment density information.

6. The method of claim 1, further comprising the wireless communication device determining the region and selecting the base maximum scan time period length based at least in part on the region.

7. The method of claim 1, further comprising the wireless communication device:
    determining the mobility state of the wireless communication device since initiation of the CSFB procedure; and selecting the offset applied to the base maximum scan time period length based at least in part on the mobility state.

8. The method of claim 1, further comprising the wireless communication device, in response to the premature termination of the voice call and prior to performing the scan for the one or more cells of the LTE network:
determining the mobility state of the wireless communication device since initiation of the CSFB procedure; and
in an instance in which the mobility state exceeds a threshold, camping directly on the legacy network without performing the scan for the one or more cells of the LTE network.

9. The method of claim 1, wherein determining that the voice call has prematurely terminated comprises determining that the voice call was aborted prior to completion of voice call establishment.

10. The method of claim 1, wherein determining that the voice call has prematurely terminated comprises determining that the CSFB procedure failed.

11. The method of claim 1, wherein determining that the voice call has prematurely terminated comprises determining that a radio link failure occurred on the legacy network after completion of the CSFB procedure and establishment of the voice call.

12. A wireless communication device comprising
wireless circuitry configured to transmit data to and receive data from a first network and a second network; and
processing circuitry coupled with the wireless circuitry, the processing circuitry configured to cause the wireless communication device to at least:
establish a connection with the first network;
store cell information for at least one cell of the first network while connected to the first network;
participate in a Circuit Switched Fallback (CSFB) procedure to transition the wireless communication device from the first network to the second network in response to initiation of a voice call;
determine that the voice call has prematurely terminated, wherein the wireless communication device does not have an active radio resource connection on either of the first network or the second network as a result of premature termination of the voice call; and
in response to premature termination of the voice call:
perform a scan for one or more cells of the first network based at least in part on stored cell information for up to a maximum scan time period;
reselect to a cell of the first network in an instance in which at least one cell of the first network is identified by the scan within the maximum scan time period; and
camp on the second network in an instance in which no cell of the first network is identified by the scan within the maximum scan time period,
wherein a length of the maximum scan time period comprises:
a base maximum scan time period length based on deployment density of the first network within a region in which the wireless communication device is operating and
an offset applied to the base maximum scan time period length, the offset based on a mobility state of the wireless communication device.

13. The wireless communication device of claim 12, wherein the first network is a Long Term Evolution (LTE) network, and wherein the second network is a legacy network comprising a circuit switched domain configured to service the voice call.

14. The wireless communication device of claim 12, wherein the processing circuitry is further configured to cause the wireless communication device to:
store cell information at least in part by causing the wireless communication device to store frequency information for the at least one cell of the first network; and
perform the scan for the one or more cells of the first network based at least in part on stored cell information at least in part by causing the wireless communication device to:
perform a first scan of one or more frequencies defined by the frequency information; and
in an instance in which no cell of the first network is found by the first scan, perform a full band scan for up to a duration of any time remaining in the maximum scan time period after completion of the first scan.

15. The wireless communication device of claim 12, wherein the stored cell information comprises one or more of:
frequency information for a cell of the first network on which the wireless communication device was camped when the CSFB procedure was initiated,
neighbor cell information for one or more neighbor cells broadcast by the cell of the first network on which the wireless communication device was camped when the CSFB procedure was initiated, or
frequency information for one or more cells of the first network previously identified by the wireless communication device.

16. The wireless communication device of claim 12, wherein the base maximum scan time period length is:
increased by the offset when the mobility state does not exceed a threshold, and
decreased by the offset when the mobility state exceeds the threshold.

17. The wireless communication device of claim 12, wherein the processing circuitry is further configured to cause the wireless communication device to:
determine the mobility state of the wireless communication device since initiation of the CSFB procedure; and
select the offset applied to the base maximum scan time period length based at least in part on the mobility state.

18. The wireless communication device of claim 12, wherein the processing circuitry is further configured to cause the wireless communication device, in response to the premature termination of the voice call and prior to performing the scan for the one or more cells of the first network, to:
determine the mobility state of the wireless communication device since initiation of the CSFB procedure; and
in an instance in which the mobility state exceeds a threshold, camp directly on the second network without performing the scan for the one or more cells of the first network.

19. The wireless communication device of claim 12, wherein the processing circuitry is further configured to cause the wireless communication device to determine that the voice call has prematurely terminated at least in part by causing the wireless communication device to determine a condition selected from a group consisting of:

an abortion of the voice call prior to completion of voice call establishment, a failure of the CSFB procedure, and a radio link failure on the second network after completion of the CSFB procedure and establishment of the voice call.

20. A non-transitory computer readable storage medium having computer program code stored thereon, the computer program code comprising program code, which, when executed by one or more processors implemented on a wireless communication device, is configured to cause the wireless communication device to perform a method for returning to a first network from a second network after premature termination of a circuit switched fallback (CSFB) voice call comprising:

establishing a connection with the first network;

determining occurrence of a premature termination of a voice call for which a CSFB procedure to transition the wireless communication device from the first network to the second network was initiated; and in response to premature termination of the voice call:

performing a scan for one or more cells of the first network for up to a maximum scan time period;

reselecting to a cell of the first network in an instance in which at least one cell of the network is identified by the scan within the maximum scan time period; and camping on the second network in an instance in which no cell of the first network is identified by the scan within the maximum scan time period, wherein a length of the maximum scan time period comprises:

a base maximum scan time period based on deployment density of the first network within a region in which the wireless communication device is operating, and an offset applied to the base maximum scan time period, the offset based on a mobility state of the wireless communication device.

* * * * *